(12) United States Patent
Kashiwagi et al.

(10) Patent No.: US 11,347,765 B2
(45) Date of Patent: May 31, 2022

(54) DATA PROCESSING APPARATUS AND DATA PROCESSING METHOD

(71) Applicant: NIPPON TELEGRAPH AND TELEPHONE CORPORATION, Tokyo (JP)

(72) Inventors: Keiichiro Kashiwagi, Musashino (JP); Tomoyuki Fujino, Musashino (JP); Koki Mitani, Musashino (JP); Yui Yoshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 28 days.

(21) Appl. No.: 16/340,671

(22) PCT Filed: Oct. 17, 2017

(86) PCT No.: PCT/JP2017/037579
§ 371 (c)(1),
(2) Date: Apr. 9, 2019

(87) PCT Pub. No.: WO2018/074479
PCT Pub. Date: Apr. 26, 2018

(65) Prior Publication Data
US 2019/0236077 A1    Aug. 1, 2019

(30) Foreign Application Priority Data
Oct. 20, 2016    (JP) .............................. JP2016-206034

(51) Int. Cl.
*G06F 16/00*   (2019.01)
*G06F 16/25*   (2019.01)
(Continued)

(52) U.S. Cl.
CPC ............ *G06F 16/258* (2019.01); *G06F 16/00* (2019.01); *G06F 16/2462* (2019.01);
(Continued)

(58) Field of Classification Search
CPC .. G06F 16/00; G06F 16/245; G06F 16/24561; G06F 16/2462; G06F 16/252; G06F 16/256; G06F 16/258
(Continued)

(56) References Cited

U.S. PATENT DOCUMENTS 7,418,501 B2 *  8/2008  Davis ..................... H04L 67/02
                                                    709/225
7,464,147 B1 * 12/2008  Fakhouri ................ G06Q 10/04
                                                    709/223
(Continued)

FOREIGN PATENT DOCUMENTS

JP    H04319771 A    11/1992
JP    H06-67867 A    3/1994
(Continued)

OTHER PUBLICATIONS

Hiroki Akama, et al., "Design and Evaluation of a Data Management System for WORM Data Processing", Journal of Information Processing Society of Japan, vol. 49, No. 2, Feb. 2008, p. 749-P764.
(Continued)

*Primary Examiner* — Michelle N Owyang
(74) *Attorney, Agent, or Firm* — Harness, Dickey & Pierce, P.L.C.

(57) ABSTRACT

According to an aspect of the invention, a data processing apparatus is provided. The data processing apparatus includes a data processing unit. The data processing unit is configured to perform at least part of: preprocessing on a data processing request to a common database issued by one of a plurality of applications accessing the common data-
(Continued)

base; and post-processing on a search result returned from the common database in response to the data processing request.

15 Claims, 4 Drawing Sheets

(51) Int. Cl.
  *G06F 16/2455* (2019.01)
  *G06F 16/2458* (2019.01)
(52) U.S. Cl.
  CPC ...... *G06F 16/24561* (2019.01); *G06F 16/252* (2019.01); *G06F 16/256* (2019.01)
(58) Field of Classification Search
  USPC .................................................. 707/705–780
  See application file for complete search history.

(56) References Cited

U.S. PATENT DOCUMENTS

| | | | |
|---|---|---|---|
| 8,156,110 B1* | 4/2012 | Luo | G06F 16/23 707/714 |
| 2004/0168084 A1* | 8/2004 | Owen | G06F 21/10 726/26 |
| 2007/0174536 A1* | 7/2007 | Nakagawa | G06F 3/067 711/2 |
| 2008/0177720 A1* | 7/2008 | Mordvinov | G06F 16/245 |
| 2013/0205028 A1 | 8/2013 | Crockett et al. | |
| 2016/0217013 A1* | 7/2016 | Song | G06F 16/2455 |

FOREIGN PATENT DOCUMENTS

| | | |
|---|---|---|
| JP | H07-175697 A | 7/1995 |
| JP | H09-319757 A | 12/1997 |
| JP | 2000-3367 A | 1/2000 |
| JP | 2009259039 A | 11/2009 |
| JP | 2011210120 A | 10/2011 |
| JP | 2015106219 A | 6/2015 |

OTHER PUBLICATIONS

International Search Report (in English and Japanese) and Written Opinion of the International Searching Authority (in Japanese) issued in PCT/JP2017/037579, dated Jan. 23, 2018; ISA/JP.
Japanese Office Action regarding JP2018546361, dated Dec. 3, 2019.
International Preliminary Report on Patentability regarding PCT/JP2017/037579, including the English translation of the Written Opinion of the ISA, dated May 2, 2019.
CA Extended European Search Report from counterpart EP178618633, dated Apr. 17, 2020.

* cited by examiner

DATA PROCESSING APPARATUS AND DATA PROCESSING METHOD

CROSS-REFERENCE TO RELATED APPLICATIONS

This application is a 371 of U.S. National State of International Application No. PCT/JP2017/037579, filed on Oct. 17, 2017, which claims priority to Japanese Application No. 2016-206034, filed on Oct. 20, 2016. The entire disclosures of the above applications are incorporated herein by reference.

FIELD

The present invention relates to data processing associated with a database search.

BACKGROUND

In recent years, the Internet of Things (IoT) which connects a large number of sensors/devices to a network and collects/utilizes data is gathering attention. Data collected from sensors/devices is stored in a database and referred to for utilization by an application. The number of applications that access the database is not limited to one. That is, a system in which a plurality of different applications access one database in common can be constructed.

In response to a data processing request from an application, a conventional database performs preprocessing such as a query conversion of the data processing request, and then performs a search. In addition, the conventional database may optionally perform post-processing such as statistical processing (for example, aggregation, filtering, average value calculation, and sorting) using a search result. In general, in IoT, an enormous number of data items is collected and accumulated in the database, although the sizes of the individual data items collected from the sensors/devices are small. Therefore, in IoT, a large data processing load is imposed on the database. Consequently, particularly in IoT, when a plurality of applications request data processing to the database at the same time, hardware resources such as a computational capacity (central processing unit (CPU) and storage area (memory) of the database are occupied for long time by a specific application; on the other hand, the waiting times of the remaining applications increase.

It is also assumed to have an application and a database coexist as different virtual units (which may be, for example, a virtual machine, and a container) in the same apparatus by using virtual technology. In this case, an upper limit of available resources can be set for each of the application virtual unit and the database virtual unit. However, if the hardware resources available for the database virtual unit are occupied for a long time by a specific application, the waiting times of the remaining applications also increase.

SUMMARY

The present invention is intended to improve fairness of database utilization among a plurality of applications.

According to an aspect of the invention, a data processing apparatus is provided. The data processing apparatus includes a data processing unit. The data processing unit is configured to perform at least part of: preprocessing on a data processing request to a common database issued by one of a plurality of applications accessing the common database; and post-processing on a search result returned from the common database in response to the data processing request.

According to another aspect of the invention, a data processing apparatus is provided. The data processing apparatus includes a first virtual unit and a second virtual unit. The first virtual unit includes a first data processing unit configured to perform at least part of: preprocessing on a first data processing request to a common database issued by a first application which is one of a plurality of applications accessing the common database; and post-processing on a first search result returned from the common database in response to the first data processing request. The second virtual unit includes a second data processing unit configured to perform at least part of: preprocessing on a second data processing request to the common database issued by a second application which is one of the plurality of applications; and post-processing on a second search result returned from the common database in response to the second data processing request.

The present invention can improve fairness of database utilization among a plurality of applications.

DETAILED DESCRIPTION

Figure 1:
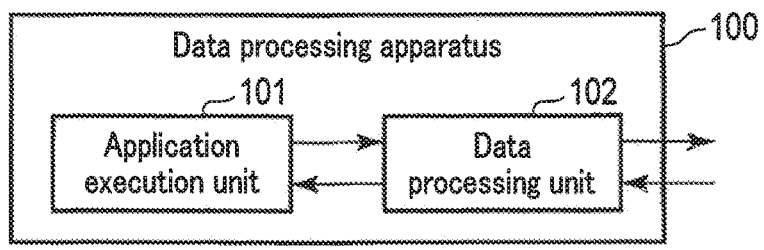
FIG. 1 is a block diagram illustrating a data processing apparatus according to a first embodiment.

Hereinafter, embodiments will be described with reference to the drawings. Hereinafter, the elements which are the same as or similar to those previously described are assigned with the same or similar reference numerals or symbols, and redundant descriptions will, in principle, be omitted. For example, when there is a plurality of identical or similar elements, a common reference numeral or symbol may be used for descriptions without distinction between the elements, and branch numerals or symbols may be used in addition to the common reference numeral or symbol for descriptions with distinction between the elements.

First Embodiment

As illustrated in FIG. 1, a data processing apparatus 100 according to a first embodiment includes an application execution unit 101 and a data processing unit 102. The data processing apparatus 100 is typically a computer, and includes a processor, such as a CPU, and a memory. The processor can function as the application execution unit 101 and the data processing unit 102, respectively, by executing predetermined programs loaded in the memory. The application is not limited to an application installed in the data processing apparatus 100, and may include a web application, a cloud application, and the like.

The application execution unit 101 and the data processing unit 102 may be implemented as one virtual unit (which may be, for example, a virtual machine or a container) in the data processing apparatus 100, or may be implemented as different virtual units. Furthermore, the application execution unit 101 may not be included in the data processing apparatus 100, but be included in a different apparatus (which can be called, for example, an application apparatus) from the data processing apparatus 100.

The application execution unit 101 executes one of a plurality of applications accessing a common database, and issues a data processing request (which may be, for example, a data reference request) to the database. The application execution unit 101 sends the issued data processing request to the data processing unit 102.

The application execution unit 101 also receives, from the data processing unit 102, a database search result corresponding to the data processing request already issued by the application execution unit 101, or a post-processing result obtained by performing post-processing, to be described later, on the search result.

The data processing unit 102 receives a data processing request from the application execution unit 101, and performs preprocessing on the data processing request. The preprocessing may be, for example, a query conversion of the data processing request. The data processing unit 102 sends the preprocessed data processing request to a database (for example, a database management apparatus 200 to be described later).

The data processing unit 102 also receives, from the database management apparatus 200, a database search result corresponding to the preprocessed data processing request. The data processing unit 102 performs post-processing on the search result as necessary. The post-processing may be, for example, statistical processing (for example, aggregation, filtering, average value calculation, or sorting) using the search result. Specifically, the data processing unit 102 may decide to perform post-processing when the data processing request includes post-processing, and may decide not to perform post-processing otherwise. The data processing unit 102 returns the post-processing result to the application execution unit 101 when post-processing is performed, and returns the search result to the application execution unit 101 when post-processing is not performed.

The data processing unit 102 may be implemented as, for example, a common application in which the above functions are incorporated. Alternatively, the data processing unit 102 may implement a web server, such as node.js, in which the above functions are incorporated. The application execution unit 101 may be connected to the data processing unit 102 via, for example, an application programming interface (API) (for example, a REST API) for converting the data processing request.

Figure 2:
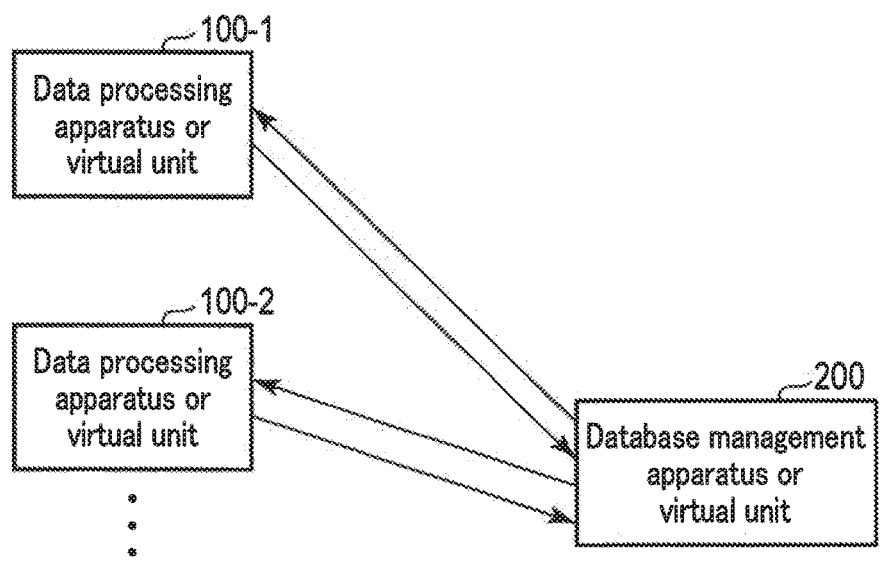
FIG. 2 is a block diagram illustrating a data processing system including the data processing apparatus according to the first embodiment.

The data processing apparatus 100 is part of the data processing system illustrated in FIG. 2. The data processing system of FIG. 2 includes a database management apparatus 200, and a plurality of data processing apparatuses 100-1, 100-2, . . . that execute a plurality of applications that access the database management apparatus 200 in common.

Part or all of the database management apparatus 200, and the data processing units 102-1, 102-2, . . . included in the data processing apparatuses 100-1, 100-2, . . . may be implemented as a plurality of different virtual units in the same computer (which may be, for example, called by a more specific name such as a data processing apparatus, or a database management apparatus). Specifically, the database management apparatus 200, and one or more data processing units 102 included respectively in one or more data processing apparatuses 100 may be implemented as a plurality of different virtual units in the same computer, or a plurality of data processing units 102 included respectively in a plurality of data processing apparatuses 100 may be implemented as a plurality of different virtual units in the same computer.

Figure 3:
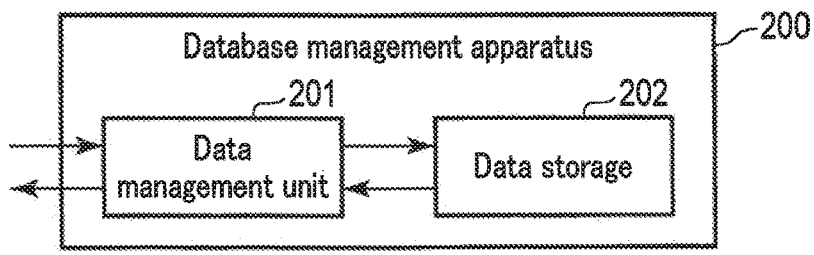
FIG. 3 is a block diagram illustrating the database of FIG. 2.

As illustrated in FIG. 3, the database management apparatus 200 (or database virtual unit) includes a data management unit 201 and a data storage 202. The database management apparatus 200 is typically a computer, and includes a processor such as a CPU, a memory, and an auxiliary storage device (which may be, for example, a hard disk drive (HDD), or a solid state drive (SSD)). The processor can function as the data management unit 201 by executing a predetermined program loaded in the memory. The auxiliary storage device functions as the data storage 202.

The data management unit 201 receives a preprocessed data processing request from one data processing apparatus 100 (or data processing virtual unit). The data management unit 201 searches a database constructed in the data storage 202 in accordance with the preprocessed data processing request. Then, the data management unit 201 returns the search result to the data processing device 100, which is the source of the preprocessed data processing request.

The data management unit 201 also updates the database by writing the data collected from the sensor/device (for example, the sensor/device 400 in FIG. 4) in the data storage 202.

In the data storage 202, the data collected from the sensor/device is written by the data management unit 201 and is stored permanently. A set of data accumulated in the data storage 202 corresponds to the database. The database constructed in the data storage 202 is searched by the data management unit 201 as necessary.

Figure 4:
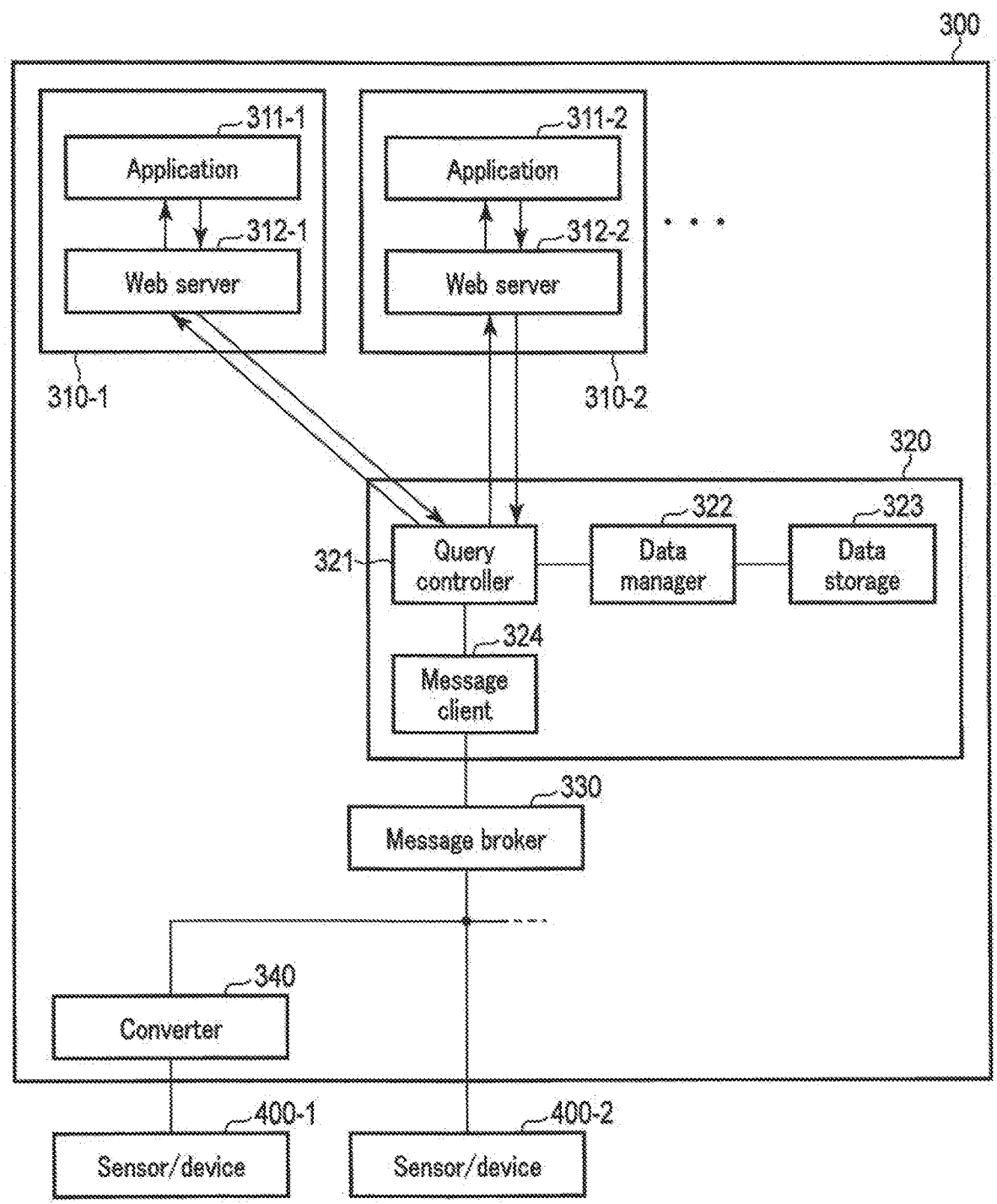
FIG. 4 is a block diagram illustrating details of the data processing system including the data processing apparatus according to the first embodiment.

FIG. 4 illustrates the details of a data processing system 300 according to the first embodiment. The data processing system 300 includes a plurality of data processing virtual units 310-1, 310-2, . . . , a database virtual unit 320, a message broker 330, and a converter 340. In the data processing system 300, a database is constructed using data collected from a plurality of sensors/devices 400-1, 400-2, . . . , and a plurality of applications access the database in common.

The data processing virtual unit 310 can be replaced with independent hardware (for example, the data processing apparatus 100). Similarly, the database virtual unit 320 can be replaced with independent hardware (for example, the database management apparatus 200).

Each data processing virtual unit 310 implements an application 311 and a web server 312. The application 311 and the web server 312 correspond to the application execution unit 101 and the data processing unit 102, respectively. Although not shown in FIG. 4, the web server 312 may be a common application in which the same functions as those of the data processing unit 102 are incorporated. In addition, the application 311 may be implemented in a virtual unit (which may be called an application virtual unit) different from the data processing virtual unit 310, or independent hardware (for example, an application apparatus).

The application 311 issues a data processing request to the database implemented in the database virtual unit 320. The application 311 sends the issued data processing request to the web server 312.

The application 311 also receives, from the web server 312, a database search result corresponding to the data processing request already issued by the application 311, or a post-processing result obtained by performing post-processing on the search result.

The web server 312 receives the data processing request from the application 311, and performs preprocessing on the data processing request. The web server 312 sends the preprocessed data processing request to the database virtual unit 320.

Specifically, the web server 312 establishes a session with the application 311, and receives the data processing request from the application 311. Then, the web server 312 can perform, as preprocessing on the data processing request, (1) acceptance of a hyper text markup language (HTML) request, (2) parsing of a request body in a format such as JavaScript (registered trademark) object notation (JSON) or extensible markup language (XML), and (3) query analysis. The query analysis may include, for example, determination of whether the data processing request is a data write request or a data search request and, if it is a search request, include analysis of a search condition.

The application 311 may be connected to the web server 312 via an API or the like for converting the data processing request.

The web server 312 also receives from the database a database search result corresponding to the preprocessed data processing request. The web server 312 performs post-processing on the search result as necessary. The web server 312 returns the post-processing result to the application 311 when post-processing is performed, and returns the search result to the application 311 when post-processing is not performed.

Specifically, the web server 312 receives from a query controller 321 the database search result corresponding to the preprocessed data processing request. As post-processing on the search result, the web server 312 can perform statistical processing, cache processing, and the like on the obtained data, as necessary.

The web server 312 establishes a one-to-one session with the query controller 321. Here, the web server 312 can reduce the processing load on the query controller 321 by establishing/maintaining the session using a simple protocol that continuously maintains a one-to-one session. In addition, security can be enhanced by using a Secure Sockets Layer (SSL) as the protocol between the web server 312 and the query controller 321.

The processing load on the query controller 321 is reduced by causing the web server 312 to bear the loads of these preprocessing and post-processing and most of the processing load of when establishing/maintaining the session. Therefore, fairness of when a plurality of data processing apparatuses 100 are connected to one database management apparatus 200 can be increased.

The database virtual unit 320 includes a query controller 321, a data manager 322, a data storage 323, and a message client 324. The query controller 321, the data manager 322, and the message client 324 correspond to the data management unit 201. The data storage 323 corresponds to data storage 202.

The query controller 321 receives a preprocessed data processing request from one data processing virtual unit 310, and sends it to the data manager 322. The query controller 321 also receives the search result from the data manager 322, and returns it to this data processing virtual unit 310.

Specifically, the query controller 321 establishes a session with the web server 312 of one data processing virtual unit 310, and receives preprocessed (for example, subjected to the aforementioned (1) acceptance of HTML request, (2) parsing of a request body in a format such as JSON, or XML, and (3) query analysis) data processing request from the web server 312. Then, the query controller 321 performs deserialization processing and processing (validation) for checking whether the type of deserialized data is appropriate or not on the received data. In addition, the query controller 321 sends a data search or write request to the data manager 322 in accordance with the query analyzed by the web server 312. The query controller 321 also receives a data search or write result, that is, a data processing result, from the data manager 322, performs serialization processing on data in accordance with the communication protocol between the data processing virtual unit 310 and the web server 312, and returns the result to the web server 312.

The query controller 321 also establishes a session with the message client 324, receives parsed data from the message client 324, performs deserialization processing and validation on the data, and sends a data write request to the data manager 322. The query controller 321 also sends the data received from the data manager 322 to the web server 312.

The data manager 322 receives a data search or write request from the query controller 321 and, in response thereto, searches the database constructed in the data storage 323 or writes data. The data manager 322 returns the search result or write result to the query controller 321.

The data manager 322 also receives from the query controller 321 data collected from the sensors/devices 400-1, 400-2, . . . . The data manager 322 updates the database by writing the received data in the data storage 323.

Data collected from the sensors/devices 400-1, 400-2, . . . is written in the data storage 323 by the data manager 322. A set of data accumulated in the data storage 323 corresponds to the database. The database constructed in the data storage 323 is searched by the data manager 322 as necessary.

The message client 324 receives via the message broker 330 the data collected from the sensors/devices 400-1, 400-2, . . . , and sends it to the query controller 321.

The message client 324 establishes a session with the query controller 321, receives serialized data from the query controller 321, formats the message in accordance with the communication protocol with the message broker 330, and sends the result to the message broker 330. The message client 324 also establishes a session with the message broker 330, receives from the message broker 330 data collected from the sensors/devices 400-1, 400-2, . . . , performs parsing on the data, and sends the parsed data to the query controller 321. The message client 324 may directly send the parsed data to the data manager 322 without intervention of the query controller 321.

The message broker 330 receives data sent from the sensor/device 400, and sends the data to the database virtual unit 320. The message broker 330 can receive data directly from the sensor/device 400, or can receive data via the converter 340 or another functional unit. In the example of FIG. 4, the message broker 330 receives data from sensor/device 400-1 via the converter 340, and receives data from sensor/device 400-2 directly. Furthermore, the message broker 330 may be connected to the converter 340 or the sensor/device 400 via an API or the like for converting data.

The converter 340 receives data from the sensor/device 400 (sensor/device 400-1 in the example of FIG. 4), and performs a predetermined conversion. The converter 340 sends the converted data to the message broker 330. The converter 340 is, for example, implemented as software, and may be executed by a virtual unit different from the data processing virtual unit 310 and the database virtual unit 320, or may be executed by a single apparatus.

The sensor/device 400 collects predetermined data, and sends the collected data to the message broker 330. As described above, the converter 340 or another functional unit may be interposed between the sensor/device 400 and the message broker 330. The sensor/device 400 and the converter 340 may be included in the same virtual unit or apparatus, or may be included in separate virtual units or apparatuses.

Figure 5:
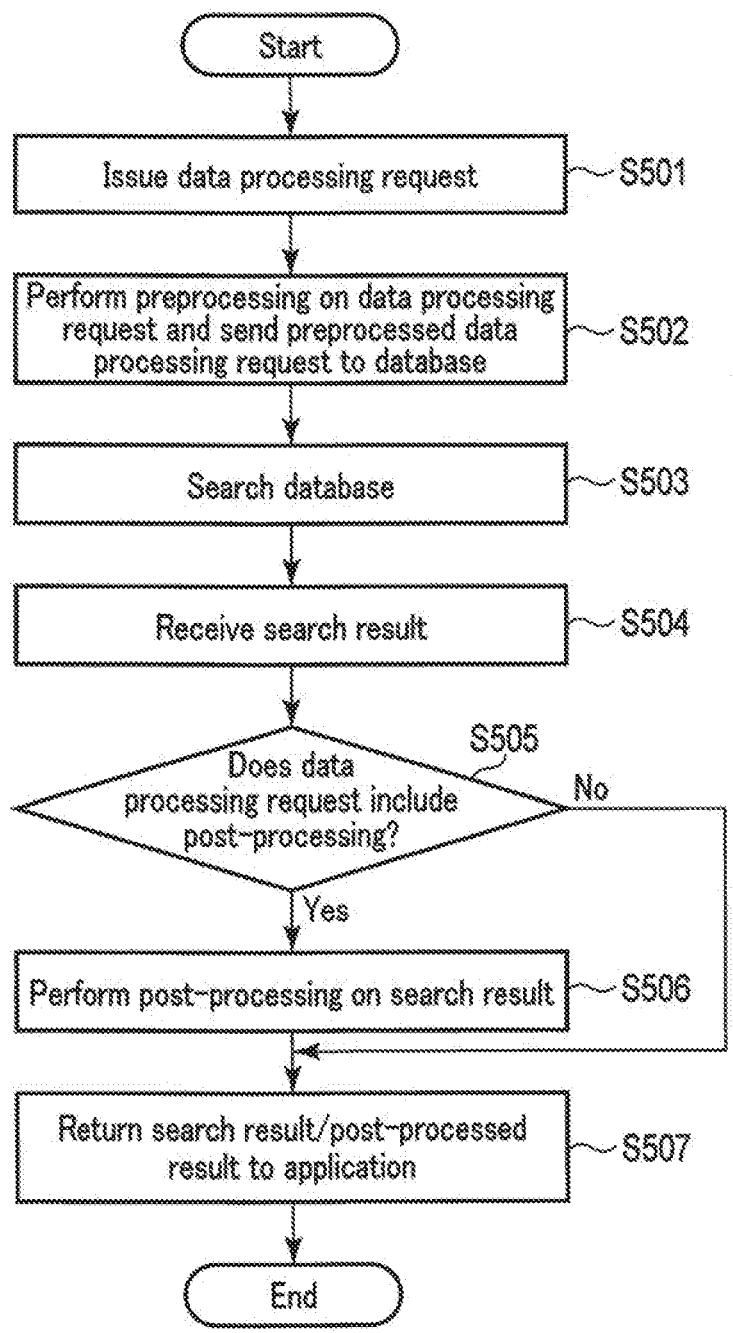
FIG. 5 is a flowchart illustrating an operation of the data processing system of FIG. 2 or FIG. 4.

FIG. 5 shows an operation example of the data processing virtual unit 310 (or data processing apparatus 100) and the database virtual unit 320 (or database management apparatus 200).

First, one application 311 (or application execution unit 101) issues a data processing request to the database (step S501). The web server 312 (or data processing unit 102) performs preprocessing on the data processing request issued in step S501, and sends the preprocessed data processing request to the database virtual unit 320 (or database management apparatus 200) (step S502).

In the next step S503, a database search (or writing) is realized by the following processes (1) to (3):

(1) In response to the preprocessed data processing request sent in step S502, the query controller 321 (or data management unit 201) performs deserialization processing and validation on received data. In addition, the query controller 321 sends a data search or write request to the data manager 322 in accordance with a query analyzed by the web server 312.

(2) In response to the data search (or write) request sent from the query controller 321 (or data management unit 201), the data manager 322 (or data management unit 201) searches (or performs writing on) the database constructed in the data storage 323 (or data storage 202). Then, the data manager 322 returns a search result (or write result) to the query controller 321.

(3) The query controller 321 (or data management unit 201) receives a search (or write) result from the data manager 322 (or data management unit 201), performs serialization processing on data, and returns the result to the web server 312 (or data processing unit 102).

The web server 312 (or data processing unit 102) establishes a session with each of the application 311 and the query controller 321, receives the search result returned in step S503 (step S504), and determines whether or not the data processing request issued in step S501 includes post-processing (step S505). If the data processing request includes post-processing, the processing proceeds to step S506; otherwise, the processing proceeds to step S507.

In step S506, the web server 312 (or data processing unit 102) performs post-processing on the search result, and the processing proceeds to step S507. In step S507, the web server 312 (or data processing unit 102) returns the search result (when step S506 is bypassed) or the post-processing result (when step S506 is performed) to the application 311 (or application execution unit 101).

Figure 6:
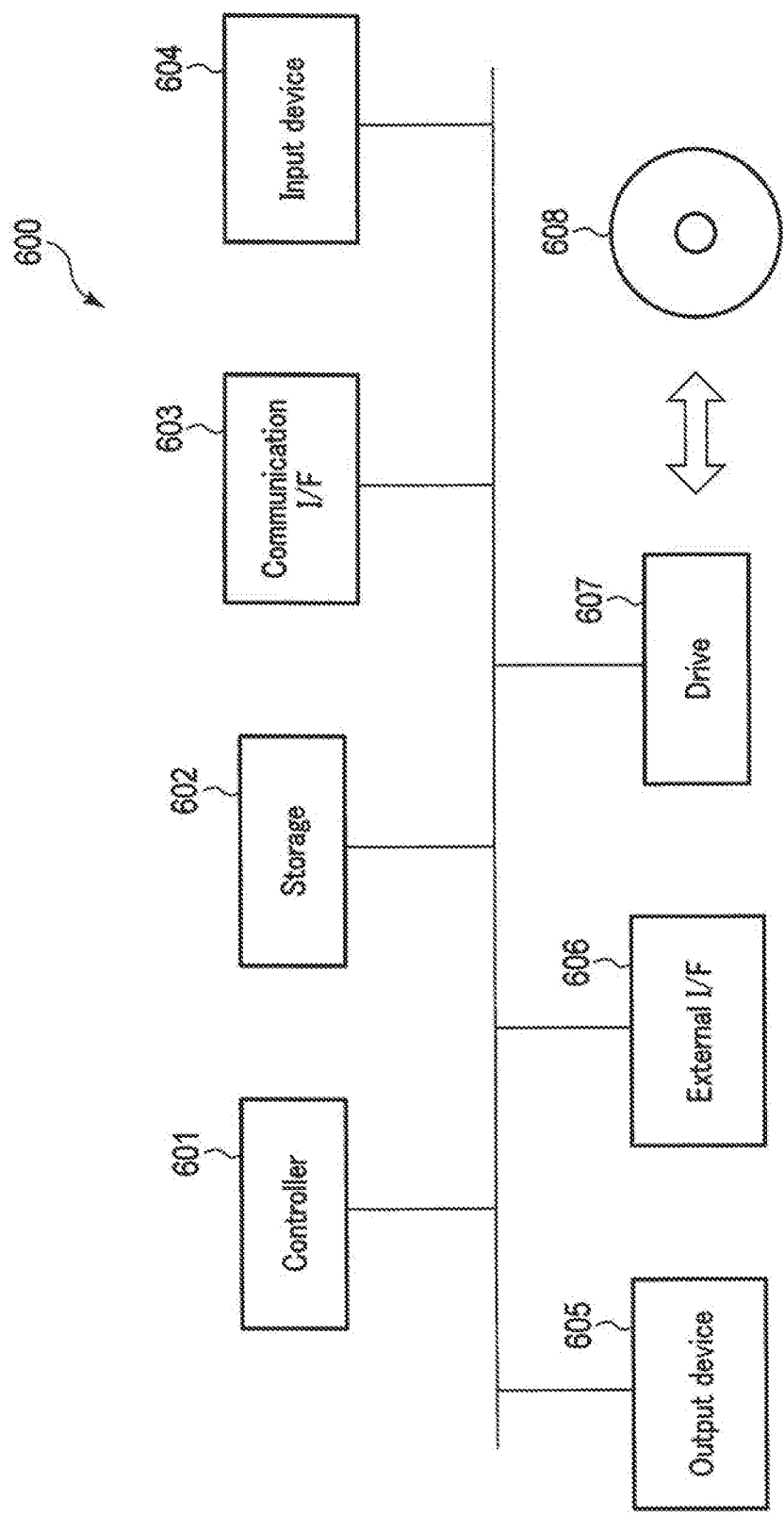
FIG. 6 is a block diagram illustrating a hardware configuration of the data processing apparatus according to the first embodiment.

Next, an example of the hardware configuration of the data processing apparatus 100 according to the present embodiment will be described with reference to FIG. 6. FIG. 6 schematically illustrates an example of the hardware configuration of the data processing apparatus 100 according to the present embodiment.

As illustrated in FIG. 6, the data processing apparatus 100 according to the present embodiment may be a computer in which a controller 601, a storage 602, a communication interface 603, an input device 604, an output device 605, an external interface 606, and a drive 607 are electrically connected. In FIG. 6, the communication interface and the external interface are shown as "communication I/F" and "external I/F", respectively.

The controller 601 includes a CPU, a random access memory (RAM), a ROM, and the like. The CPU expands a program stored in the storage 602 on the RAM. Then, the controller 601 is enabled to execute the above-described various information processing by the CPU interpreting and executing this program.

The storage 602 is a so-called auxiliary storage device, and may be, for example, a built-in or external semiconductor memory such as an HDD, an SSD, or a flash memory. The storage 602 stores, for example, programs (such as programs for causing the controller 601 to execute various processing performed by the data processing unit 102) to be executed by the controller 601, and data used by the controller 601.

The communication interface 603 is various wireless communication or wired communication modules, and may be an interface for performing wireless communication or wired communication via a network. The input device 604 may include a device, such as a touch screen, a keyboard, a mouse, or the like, for receiving a user input.

The output device 605 is a device, such as a display, a speaker, or the like, for performing an output. The external interface 606 is a universal serial bus (USB) port, a memory card slot, or the like, and is an interface for connection to an external apparatus.

The drive 607 is a compact disc (CD) drive, a digital versatile disc (DVD) drive, a blue-ray (registered trademark) disc (BD) drive, or the like. The drive 607 reads a program and/or data stored in a storage medium 608, and transfers it to the controller 601. Some or all of the programs and data described above as being able to be stored in the storage 602 may be read from the storage medium 608 by the drive 607.

The storage medium 608 is a medium that accumulates programs and/or data by electrical, magnetic, optical, mechanical, or chemical action in a format readable by a machine including a computer. The storage medium 608 is a removable disc medium such as a CD, a DVD, and a BD, but is not limited thereto, and may be a flash memory or other semiconductor memories.

With respect to the specific hardware configuration of the data processing apparatus 100, structural elements can be omitted, replaced or added as appropriate in accordance with the embodiment. For example, the controller 601 may include a plurality of processors. The data processing apparatus 100 may be an information processing apparatus designed exclusively for service to be provided or may be a general-purpose information processing apparatus, such as a smartphone, a tablet personal computer (PC), a laptop PC, or a desktop PC. Furthermore, the data processing apparatus 100 may be constituted by a plurality of information processing apparatuses or the like.

As described above, the data processing apparatus according to the first embodiment includes a hardware resource (such as a virtual unit) that executes data processing, and executes, by the hardware resource, most of the preprocessing (such as a query conversion and parsing) and post-processing (such as statistical processing (for example, aggregation, filtering, average value calculation or sorting) using a search result, and cache processing of obtained data), and most of the processing for establishing/maintaining a session with the database management apparatus, which have been conventionally performed in the database in association with a search. Therefore, according to this data processing apparatus, most of the loads of preprocessing, post-processing, and processing for managing the session on the database is removed; therefore, even when a plurality of applications issue data processing requests at the same time, each application needs to occupy the hardware resource of the database only for a short time. That is, fairness of database utilization among a plurality of applications can be improved. Since the loads of preprocessing and post-processing increase as the number of data items increases, the effect of removing such loads is particularly large in IoT that handles a large number of data items each having a small size.

In the above description, both preprocessing and post-processing are distributed among data processing apparatuses or virtual units that handle a data processing request issued by each application, thereby improving fairness of database utilization. However, even if part of the preprocessing and post-processing is distributed among the data processing apparatuses or virtual units, and the remaining part is intensively performed in the database, the above effect can be gained to some extent.

The above-described embodiments merely show specific examples to aid understanding of the concept of the present invention, and are not intended to limit the scope of the present invention. Addition, deletion or transformation of various structural elements can be made to the embodiments without departing from the gist of the present invention.

The various functional units described in the above embodiments may be realized by using a circuit. The circuit may be a dedicated circuit for realizing a specific function, or a general-purpose circuit such as a processor.

At least part of the processing of the above embodiments can also be realized by using a general-purpose computer as basic hardware. The program for realizing the above processing may be provided by being stored in a computer-readable recording medium. The program is stored in a recording medium as a file in an installable format or a file in an executable format. The recording medium is a magnetic disc, an optical disc (such as a CD-ROM, a CD-R, or a DVD), a magneto-optical disc (such as an MO), a semi-conductor memory, or the like. The recording medium may be any recording medium as long as it can store a program and can be read by a computer. Furthermore, a program that realizes the above processing may be stored on a computer (server) connected to a network such as the Internet, and downloaded to a computer (client) via the network.

The invention claimed is:

1. A data processing apparatus residing on a host computer and being separate from a database management apparatus including a common database, comprising:
    a processor; and
    a storage medium having computer program instructions stored thereon to, when executed by the processor, perform:
    preprocessing on a first data processing request to access data in the common database issued by a first respective application which is one of a plurality of applications accessing the data in the common database while the common database is accessible from other data processing apparatuses having the applications, wherein the data is collected from at least one of sensors or devices, the preprocessing on the first processing request includes a process of establishing a session with the first respective application and determining a processing load of the first data processing request preprocessing is more than a processing load of a corresponding process in the database management apparatus before transmitting the first data processing request to the common database; and
    post-processing on a first search result returned from the common database in response to the preprocessed first data processing request, wherein the post-processing on the first search result includes receiving the first search result, determining a processing load of the post-processing on the first search result is more than a processing load of a corresponding process in the database management apparatus, and determining the first search request includes a condition of post processing of the first search result, and providing the post-processed first search result to first respective application;
    preprocessing on a second data processing request to access the common database issued by a respective second application which is one of the plurality of applications, wherein the preprocessing on the second processing request includes a process of establishing a session with the second respective application and determining a processing load of the second data processing request preprocessing is more than a processing load of a corresponding process in the database management apparatus before transmitting the second data processing request to the common database; and
    post-processing on a second search result returned from the common database in response to the preprocessed second data processing request, wherein the post-processing on the second search result includes receiving the second search result, determining a processing load of the post-processing on the second search result is more than a processing load of a corresponding process in the database management apparatus and determining the second search request includes a condition of post processing of the second search result, and providing the post-processed second search result to second respective application.

2. The data processing apparatus according to claim 1, wherein the computer program instructions further perform:
    preprocessing including a query conversion on the data processing request; and
    post-processing including statistical processing using the search result.

3. The data processing apparatus according to claim 1, further comprising a first virtual unit for the common database,
    wherein a data processing unit is included in a second virtual unit different from the first virtual unit.

4. The data processing apparatus according to claim 1, wherein the computer program instructions further perform to establish each session using a protocol that continuously maintains a session on a one-to-one basis, and perform at least one of transmission of the preprocessed first data processing request, reception of the first search result, preprocessed of the second data processing request, or reception of the second search result.

5. The data processing apparatus according to claim 1, wherein the computer program instructions further perform at least one of (1) acceptance and parsing of a request from one of the plurality of applications as at least part of the preprocessing on first data processing request or second data processing request, (2) caching of the first search result or the second search result as at least part of the post-processing on the first search result or the second search result, or (3) session management.

6. The data processing apparatus according to claim 3, wherein
the first virtual unit further includes a data management unit configured to read and write data from and in the common database,
the data management unit is configured to establish a session with the data processing unit, and perform at least one of reception of the first search result or the second search result or transmission of the first search result or the second search result, and
the data management unit is configured to perform at least one of deserialization processing on the of the first search result or the second search result or pre-transmission serialization processing on the first search result or the second search result.

7. A data processing apparatus residing on a host computer and being separate from a database management apparatus including a common database, comprising:
a first virtual unit including a first data processing unit and the first data processing unit includes
a processor; and
a storage medium having computer program instructions stored thereon to, when executed by the processor, perform:
preprocessing on a first data processing request to access data in the common database issued by a first respective application which is one of a plurality of applications accessing the data in the common database while the common database is accessible from other data processing apparatuses having the applications, wherein the data is collected from at least one of sensors or devices, the preprocessing on the first processing request includes a process of establishing a session with the first respective application and determining a processing load of the first data processing request preprocessing is more than a processing load of a corresponding process in the database management apparatus before transmitting the first data processing request to the common database;
and
post-processing on a first search result returned from the common database in response to the preprocessed first data processing request, wherein the post-processing on the first search result includes a receiving the first search result, determining a processing load of the post-processing on the first search result in the first virtual unit is more than a processing load of a corresponding process in the database management apparatus, and determining the first search request includes a condition of post processing of the first search result, and providing the post-processed first search result to first respective application;
and
a second virtual unit including a second data processing unit and the second data processing unit includes
a processor; and
a storage medium having computer program instructions stored thereon to, when executed by the processor, perform:
preprocessing on a second data processing request to access the common database issued by a respective second application which is one of the plurality of applications, wherein the preprocessing on the second processing request includes a process of establishing a session with the second respective application and determining a processing load of the second data processing request preprocessing is more than a processing load of a corresponding process in the database management apparatus before transmitting the second data processing request to the common database;
and
post-processing on a second search result returned from the common database in response to the preprocessed second data processing request, wherein the post-processing on the second search result includes a receiving the second search result, determining a processing load of the post-processing on the second search result in the second virtual unit is more than a processing load of a corresponding process in the database management apparatus and determining the second search request includes a condition of post processing of the second search result, and providing the post-processed second search result to second respective application.

8. The data processing apparatus according to claim 7, wherein
the first data processing unit is configured to perform at least part of:
preprocessing including a query conversion on the first data processing request; and
post-processing including statistical processing using the first search result, and
the second data processing unit is configured to perform at least part of:
preprocessing including a query conversion on the second data processing request; and
post-processing including statistical processing using the second search result.

9. The data processing apparatus according to claim 7, further comprising a third virtual unit for the common database.

10. The data processing apparatus according to claim 7, wherein
the first data processing unit is configured to establish the session using a protocol that continuously maintains a session on a one-to-one basis, and perform at least one of transmission of the preprocessed first data processing request or reception of the first search result, and
the second data processing unit is configured to establish the session using a protocol that continuously maintains a session on a one-to-one basis, and perform at least one of transmission of the preprocessed second data processing request or reception of the second search result.

11. The data processing apparatus according to claim 7, wherein
the first data processing unit is configured to perform at least one of (1) acceptance and parsing of a request from one of the plurality of first applications as at least part of the preprocessing on the first data processing request, (2) caching of the first search result as at least part of the post-processing on the first search result, or (3) session management, and
the second data processing unit is configured to perform at least one of (1) acceptance and parsing of a request from one of the plurality of second applications as at least part of the preprocessing on the second data processing request, (2) caching of the second search result as at least part of the post-processing on the second search result, or (3) session management.

12. The data processing apparatus according to claim 9, wherein
the third virtual unit further includes a data management unit configured to read and write data from and in the common database,
the data management unit is configured to establish a session with the first data processing unit, and perform at least one of reception of the preprocessed first data processing request or transmission of the first search result,
the data management unit is configured to perform at least one of deserialization processing on the preprocessed first data processing request or pre-transmission serialization processing on the first search result,
the data management unit is configured to establish a session with the second data processing unit, and perform at least one of reception of the preprocessed second data processing request or transmission of the second search result, and
the data management unit is configured to perform at least one of deserialization processing on the preprocessed second data processing request or pre-transmission serialization processing on the second search result.

13. A data processing method, comprising:
performing, by a first data processing apparatus or a first virtual unit, at least part of:
preprocessing on a first data processing request to access data in the common database issued by a first respective application which is one of a plurality of applications accessing the data in the common database while the common database is accessible from other data processing apparatuses having the applications, wherein the data is collected from at least one of sensors or devices, the preprocessing on the first processing request includes a process of establishing a session with the first respective application and determining a processing load of the first data processing request preprocessing in the first data processing apparatus or the first virtual unit is more than a processing load of a corresponding process in the database management apparatus before transmitting the first data processing request to the common database;
post-processing on a first search result returned from the common database in response to the preprocessed first data processing request, wherein the post-processing on the first search result includes a receiving the first search result, determining a processing load of the post-processing on the first search result in the first data processing apparatus or the first virtual unit is more than a processing load of a corresponding process in the database management apparatus, and determining the first search request includes a condition of post processing of the first search result, and providing the post-processed first search result to first respective application;
performing, by a second data processing apparatus or a second virtual unit, at least part of:
preprocessing on a second data processing request to access the common database issued by a respective second application which is one of the plurality of applications, wherein the preprocessing on the second processing request includes a process of establishing a session with the second respective application and determining a processing load of the second data processing request preprocessing the second data processing apparatus or the second virtual unit is more than a processing load of a corresponding process in the database management apparatus before transmitting the second data processing request to the common database;
post-processing on a second search result returned from the common database in response to the preprocessed second data processing request, wherein the post-processing on the second search result includes a receiving the second search result, determining a processing load of the post-processing on the second search result in the second data processing apparatus or the second virtual unit is more than a processing load of a corresponding process in the database management apparatus and determining the second search request includes a condition of post processing of the second search result, and providing the post-processed second search result to second respective application.

14. The data processing method according to claim 13, wherein
the first data processing apparatus or the first virtual unit performs at least part of:
preprocessing including a query conversion on the first data processing request; and
post-processing including statistical processing using the first search result, and
the second data processing apparatus or the second virtual unit performs at least part of:
preprocessing including a query conversion on the second data processing request; and
post-processing including statistical processing using the second search result.

15. The data processing method according to claim 13, wherein
the first data processing apparatus or the first virtual unit performs at least one of (1) acceptance and parsing of a request from one of the plurality of first applications as at least part of the preprocessing on the first data processing request, (2) caching of the first search result as at least part of the post-processing on the first search result, or (3) session management, and
the second data processing apparatus or the second virtual unit performs at least one of (1) acceptance and parsing of a request from one of the plurality of second applications as at least part of the preprocessing on the second data processing request, (2) caching of the second search result as at least part of post-processing on the second search result, or (3) session management.

* * * * *